(12) United States Patent
Ishikawa et al.

(10) Patent No.: US 12,071,877 B2
(45) Date of Patent: Aug. 27, 2024

(54) ELECTRONIC CONTROL DEVICE

(71) Applicant: Hitachi Astemo, Ltd., Hitachinaka (JP)

(72) Inventors: Hiroto Ishikawa, Hitachinaka (JP);
Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 51 days.

(21) Appl. No.: 17/927,926

(22) PCT Filed: Feb. 9, 2021

(86) PCT No.: PCT/JP2021/004716
§ 371 (c)(1),
(2) Date: Nov. 28, 2022

(87) PCT Pub. No.: WO2021/260999
PCT Pub. Date: Dec. 30, 2021

(65) Prior Publication Data
US 2023/0203979 A1    Jun. 29, 2023

(30) Foreign Application Priority Data

Jun. 24, 2020 (JP) .................. 2020-108561

(51) Int. Cl.
| | | |
|---|---|---|
| *F01N 11/00* | (2006.01) | |
| *F01N 3/20* | (2006.01) | |
| *F02D 41/02* | (2006.01) | |

(52) U.S. Cl.
CPC .......... *F01N 11/005* (2013.01); *F01N 3/2013* (2013.01); *F02D 41/0235* (2013.01)

(58) Field of Classification Search
CPC ....... B01D 53/94; B60K 6/485; B60W 10/06; B60W 10/08; B60W 20/16; F01N 3/2013;
(Continued)

(56) References Cited

U.S. PATENT DOCUMENTS 5,359,228 A  * 10/1994  Yoshida ................... B60K 6/46
                                                        903/903
5,441,122 A  *  8/1995  Yoshida ................ B60W 10/06
                                                        180/65.245
(Continued)

FOREIGN PATENT DOCUMENTS

JP        2010-229978 A     10/2010
JP        2011-231709 A     11/2011
(Continued)

OTHER PUBLICATIONS

International Search Report (PCT/ISA/210) issued in PCT Application No. PCT/JP2021/004716 dated Apr. 20, 2021 with English translation (four (4) pages).
(Continued)

*Primary Examiner* — Dapinder Singh
(74) *Attorney, Agent, or Firm* — Crowell & Moring LLP

(57) ABSTRACT

A temperature of a catalyst (EHC) is estimated with high accuracy. An electronic control device of the present invention controls an engine system that includes: an internal combustion engine; a motor capable of motoring the internal combustion engine; a catalyst that is installed in an exhaust passage of the internal combustion engine, has a function of being heated by energization, and purifies exhaust gas; and a downstream temperature sensor installed on the downstream side of the catalyst. The electronic control device includes: a control unit that causes the motor to motor the internal combustion engine; and an estimation unit that performs a first estimation process of estimating a temperature of the catalyst based on detection information of the downstream temperature sensor when the internal combustion engine is motored.

6 Claims, 10 Drawing Sheets

(58) Field of Classification Search
CPC .... F01N 9/005; F01N 11/005; F01N 2560/06; F01N 2900/0416; F01N 2900/1602; F02D 41/0235; Y02T 10/12; Y02T 10/40; Y02T 10/62
See application file for complete search history.

(56) References Cited

U.S. PATENT DOCUMENTS

| | | |
|---|---|---|
| 8,751,187 B2 | 6/2014 | Hirai et al. |
| 10,677,136 B2 | 6/2020 | Nakada et al. |
| 11,519,313 B1 * | 12/2022 | Martz ................... F01N 3/22 |
| 2010/0107608 A1 * | 5/2010 | Mitsutani ............. B60L 50/16 |
| | | 60/299 |
| 2011/0270568 A1 | 11/2011 | Hirai et al. |
| 2018/0066561 A1 | 3/2018 | Nakada et al. |

FOREIGN PATENT DOCUMENTS

| | | |
|---|---|---|
| JP | 2015-202832 A | 11/2015 |
| WO | WO 2015/159218 A2 | 10/2015 |
| WO | WO 2015/159218 A3 | 10/2015 |
| WO | WO 2016/140211 A1 | 9/2016 |

OTHER PUBLICATIONS

Japanese-language Written Opinion (PCT/ISA/237) issued in PCT Application No. PCT/JP2021/004716 dated Apr. 20, 2021 (three (3) pages).

* cited by examiner

ELECTRONIC CONTROL DEVICE

TECHNICAL FIELD

The present invention relates to an electronic control device.

BACKGROUND ART

An exhaust pipe of an internal combustion engine is provided with a catalyst for purifying exhaust gas. The catalyst may have a low temperature immediately after the internal combustion engine is started, and the catalyst does not exhibit an effect when the temperature is low. Therefore, an unpurified exhaust gas may be released to the atmosphere immediately after the start of the internal combustion engine. In addition, it is difficult to maintain the temperature of the catalyst while the internal combustion engine is being stopped. Thus, even in a hybrid vehicle, there is a problem that it is difficult to stop the internal combustion engine in order to maintain the temperature of the catalyst.

Therefore, mounting of an electrically heated catalyst (hereinafter referred to as "EHC") that can be heated by allowing a current to flow has been studied in order to maintain the temperature of the catalyst even during the stop of the internal combustion engine. PTL 1 discloses an EHC control system. The EHC control system disclosed in PTL 1 controls a temperature of an EHC using a resistance value obtained from a voltage and a current at the time of energization on the assumption that the resistance value of the EHC has a temperature dependence.

CITATION LIST

Patent Literature

PTL 1: JP 2010-229978 A

SUMMARY OF INVENTION

Technical Problem

However, a change in the resistance value of the EHC may be small with respect to a change in the temperature depending on a material. Thus, when measurement errors of the voltage and current or fluctuations in characteristics occur, it becomes difficult to specify the temperature of the EHC from the resistance value.

The present invention has been made in view of the above circumstances, and an object thereof is to estimate a temperature of an EHC with high accuracy.

Solution to Problem

In order to solve the above problem and achieve the object of the present invention, an electronic control device of the present invention controls an engine system which includes: an internal combustion engine; a motor capable of motoring the internal combustion engine; a catalyst that is installed in an exhaust passage of the internal combustion engine, has a function of being heated by energization, and purifies exhaust gas; and a downstream temperature sensor installed on the downstream side of the catalyst. The electronic control device includes: a control unit that causes the motor to motor the internal combustion engine; and an estimation unit that performs a first estimation process of estimating a temperature of the catalyst based on detection information of the downstream temperature sensor when the internal combustion engine is motored.

Advantageous Effects of Invention

According to the electronic control device having the above configuration, the temperature of the EHC can be estimated with high accuracy.

Incidentally, other objects, configurations, and effects which have not been described above will become apparent from an embodiment to be described hereinafter.

DESCRIPTION OF EMBODIMENTS

1. Embodiment

Figure 1:
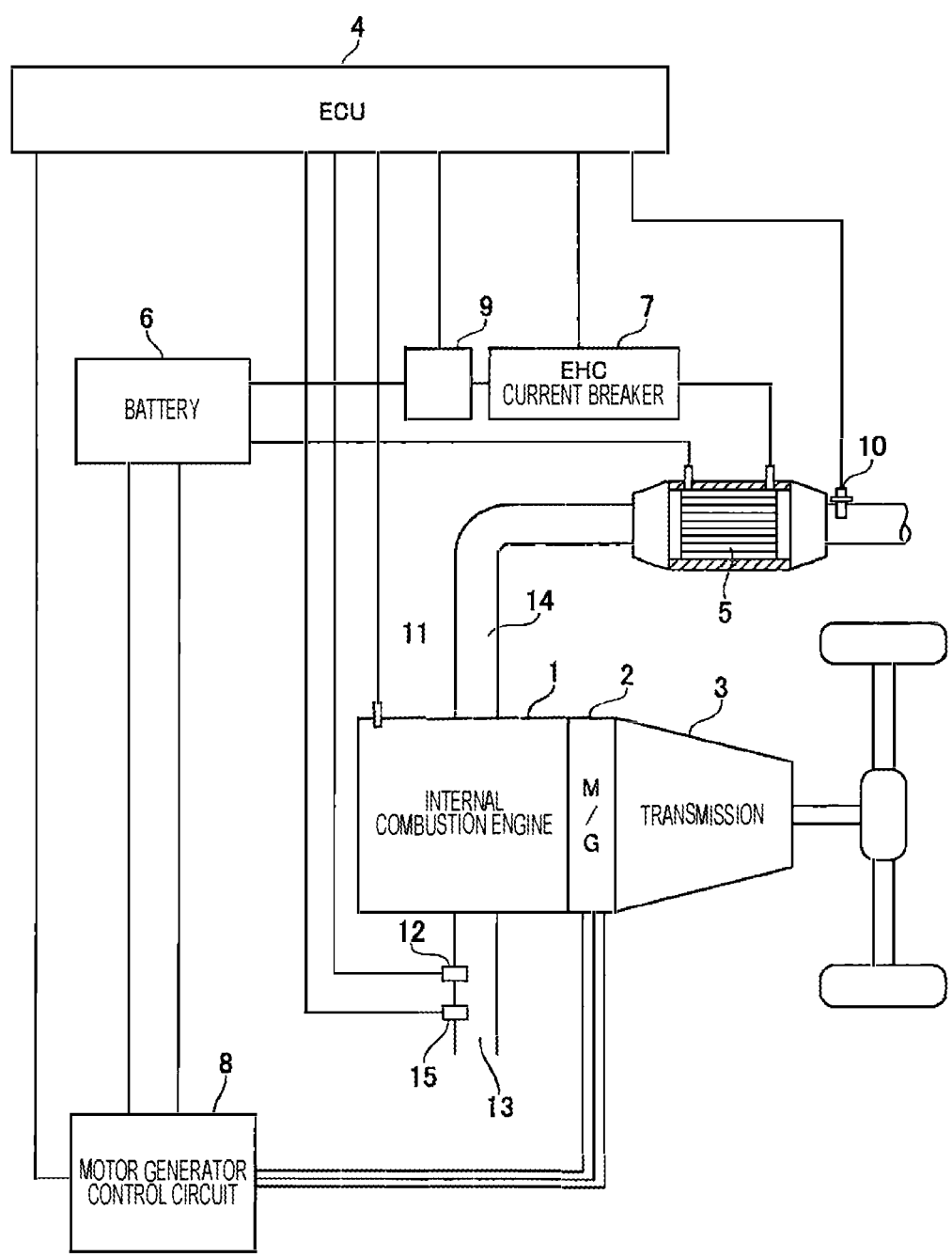
FIG. 1 is a schematic configuration diagram of the entire system to be controlled by an electronic control device according to an embodiment of the present invention.

Hereinafter, an electronic control device according to an embodiment of the present invention will be described with reference to FIGS. 1 to 12. Incidentally, common members in the drawings will be denoted by the same reference signs.

[Configuration of System to be Controlled by Electronic Control Device]

First, a configuration example of the entire engine system to be controlled by the electronic control device according to the embodiment of the present invention will be described.

FIG. 1 is a schematic configuration diagram of the entire system to be controlled by the electronic control device.

The system to be controlled by the electronic control device includes an internal combustion engine 1, a motor generator 2, a transmission 3, an electronic control unit (ECU) 4, an EHC 5, a battery 6, an EHC current breaker 7, a motor generator control circuit 8, a voltage/current sensor 9, a catalyst downstream temperature sensor 10, a rotation sensor 11, and an intake air temperature sensor 12.

The internal combustion engine 1 is provided with the rotation sensor 11. The rotation sensor 11 detects rotation and a phase of a crankshaft provided in the internal combustion engine 1. In addition, an intake flow path 13 and an exhaust flow path 14 communicate with the internal combustion engine 1. An intake pressure sensor 15 and an intake air temperature sensor 12 are installed in the intake flow path 13. The intake pressure sensor 15 detects the amount (inflow amount) of air flowing into the intake flow path 13. The intake air temperature sensor 12 detects a temperature of the air flowing into the intake flow path 13.

The EHC 5 and the catalyst downstream temperature sensor 10 are installed in the exhaust flow path 14. Electrodes are installed in the EHC 5. The EHC 5 allows a current to flow between the electrodes to generate heat and purifies a harmful substance in exhaust gas. The catalyst downstream temperature sensor 10 is arranged on the downstream side of the EHC 5. The catalyst downstream temperature sensor 10 detects a temperature of the air that has passed through the EHC 5.

The motor generator 2 is provided between the internal combustion engine 1 and the transmission 3. The motor generator 2 is controlled by the motor generator control circuit 8. The motor generator 2 drives the internal combustion engine 1. In addition, the motor generator 2 operates to generate power after the internal combustion engine 1 is started. The power (generated electric power) generated by the motor generator 2 is charged in the high-voltage battery 6. The motor generator 2 generates a driving force by being supplied with the power from the battery 6. The transmission 3 shifts a driving force of the internal combustion engine 1, a driving force of the motor generator 2, or driving forces of the internal combustion engine 1 and the motor generator 2 to appropriate torque and rotational speed.

The ECU 4 illustrates a specific example of the electronic control device of the present invention. The ECU 4 is an arithmetic circuit that executes various types of data processing. The ECU 4 controls the EHC current breaker 7 based on detection information of the rotation sensor 11, the voltage/current sensor 9, the catalyst downstream temperature sensor 10, and the intake air temperature sensor 12. The EHC current breaker 7 switches on and off of energization with respect to the EHC 5. The voltage/current sensor 9 detects a voltage and a current of power supplied to the EHC 5.

The ECU 4 outputs a motoring request to the motor generator control circuit 8. When receiving the motoring request, the motor generator control circuit 8 controls the motor generator 2 to rotationally drive the internal combustion engine by the driving force of the motor generator 2. Further, various sensors (not illustrated) and various actuators (not illustrated) are connected to the ECU 4. The ECU 4 controls driving of the various actuators (not illustrated) based on detection information of the various sensors (not illustrated), and controls the output of the internal combustion engine 1.

Configuration Example of Functional Blocks of ECU

Next, a functional configuration example of the ECU 4 will be described.

Figure 2:
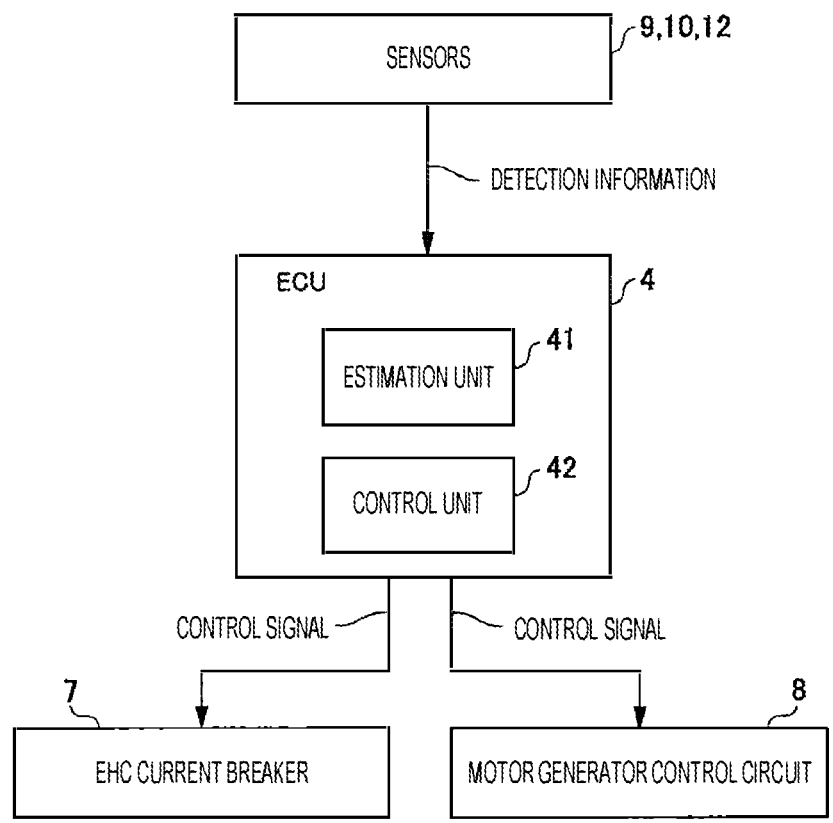
FIG. 2 is a diagram illustrating a configuration example of functional blocks of the electronic control device according to the embodiment of the present invention.

FIG. 2 is a diagram illustrating a configuration example of functional blocks of the ECU 4.

The ECU 4 includes an estimation unit 41 and a control unit 42.

The estimation unit 41 acquires detection information of various sensors (for example, the voltage/current sensor 9, the catalyst downstream temperature sensor 10, the intake air temperature sensor 12, and the like) provided in the engine system and estimates a temperature of the EHC 5 (hereinafter referred to as "EHC temperature").

The control unit 42 controls the energization with respect to the EHC 5 based on the EHC temperature estimated by the estimation unit 41. In addition, the control unit 42 issues a command for motoring the internal combustion engine 1. The motoring request is output to the motor generator control circuit 8. Thus, the control unit 42 outputs a control signal to the EHC current breaker 7 and the motor generator control circuit 8.

<Hardware Configuration of ECU>

Next, a hardware configuration example of the ECU 4 will be described.

Figure 3:
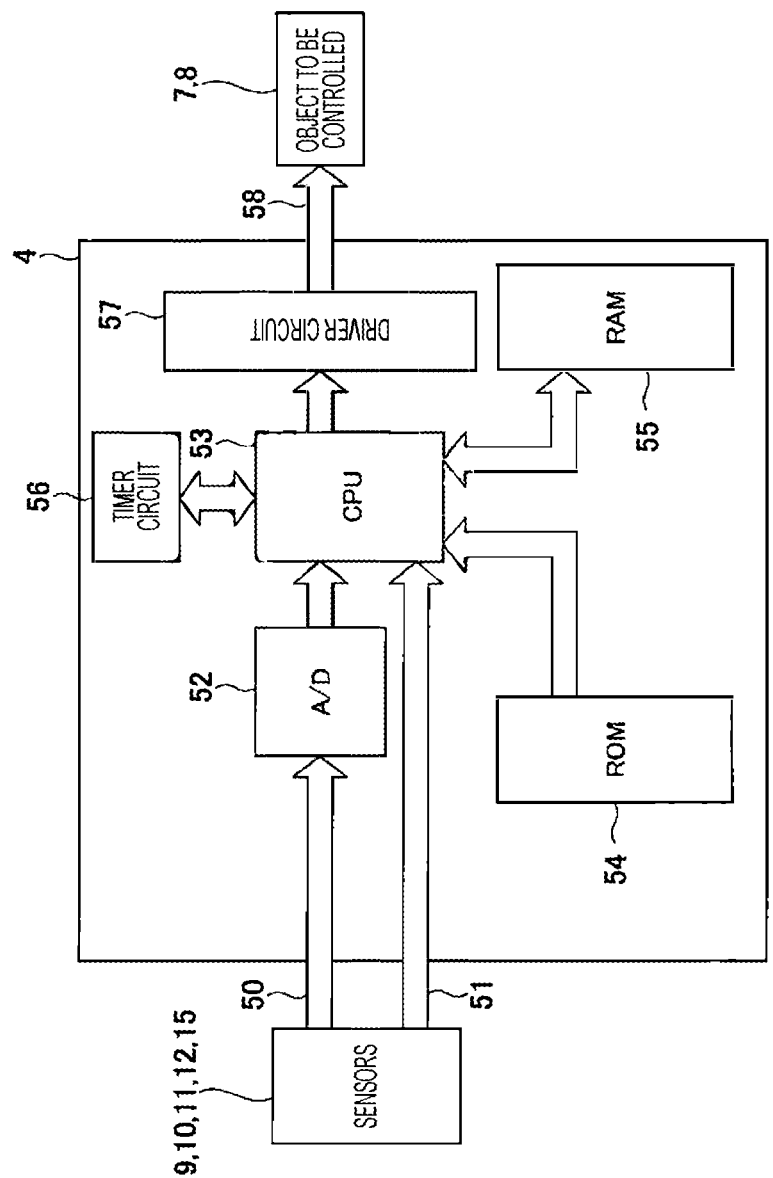
FIG. 3 is a block diagram illustrating a hardware configuration example of the electronic control device according to the embodiment of the present invention.

FIG. 3 is a block diagram illustrating the hardware configuration example of the ECU 4.

The ECU 4 includes an A/D converter 52, a central processing unit (CPU) 53 which is a central processor, a read only memory (ROM) 54, a random access memory (RAN) 55, a timer circuit 56, and a driver circuit 57. The CPU 53 implements the above-described functions by developing and executing a program stored in the ROM 54 (an example of a storage unit) on the RAM 55. The ECU 4 is configured using, for example, a microcomputer.

When signals output from the sensors are analog signals 50, the A/D converter 52 converts the signals into digital signals and outputs the digital signals to the CPU 53. The CPU 53 takes the digital signals output from the A/D converter 52 and executes control logic (programs) stored in a storage medium, such as the ROM 54, to execute a wide variety of calculations, diagnosis, control, and the like. Incidentally, a calculation result of the CPU 53 and a conversion result of the A/D converter 52 are temporarily stored in the RAM 55.

In the present embodiment, a nonvolatile memory such as an electrically erasable and programmable read only memory (EEPROM) in which contents can be rewritten is used as the ROM 54. The ROM 54 stores an estimated temperature of the EHC 5 estimated last before the internal combustion engine 1 stops.

The calculation result of the CPU 53 is output from the driver circuit 57 as a control signal 58. Accordingly, the calculation result of the CPU 53 is used to control objects to be controlled such as the EHC current breaker 7 and the motor generator control circuit 8. In addition, the CPU 53 measures an elapsed time (ECU downtime) until the power is turned on since a pause of the ECU 4 using the timer circuit 56.

When an input signal is a digital signal 51, the input signal is directly sent to the CPU 53. The CPU 53 executes necessary calculations, diagnosis, control, and the like. For example, signals of the rotation sensor 11, and an intake cam angle sensor and an exhaust cam angle sensor (not illustrated) are sent to the CPU 53 as high and low signals.

[Correlation Characteristic Between EHC Temperature and Catalyst Resistance]

Next, a correlation characteristic between a catalyst temperature T and a catalyst resistance R will be described.

Figure 4:
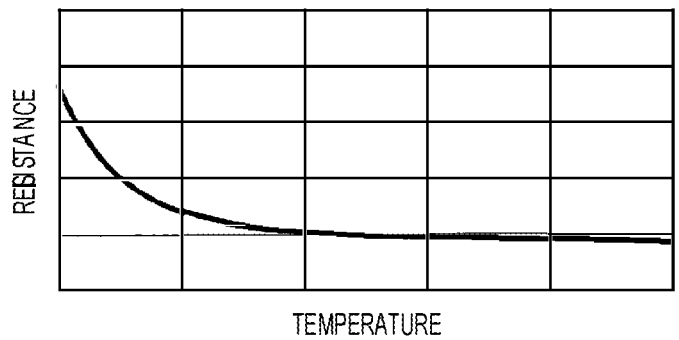
FIG. 4 is a graph illustrating a correlation characteristic (temperature-resistance characteristic) between a catalyst temperature T and a catalyst resistance R.

FIG. 4 is a graph illustrating the correlation characteristic (temperature-resistance characteristic) between the catalyst temperature T and the catalyst resistance R.

As illustrated in FIG. 4, there is a correlation between the catalyst temperature T which is a temperature of the EHC 5, and a catalyst resistance value R which is a resistance value of the EHC 5. A slope of the graph illustrating the correlation characteristic between the catalyst temperature T and the catalyst resistance value R varies depending on the temperature. In an area with a large slope, an error of the calculated catalyst temperature T is small even if measurement errors or fluctuations in the catalyst resistance value R occur. Therefore, in the area with a large slope, the energization of the EHC 5 can be controlled using the catalyst temperature T calculated based on the catalyst resistance value R.

On the other hand, in an area with a small slope, an error in the calculated catalyst temperature T increases due to the measurement errors or fluctuations in the catalyst resistance value R. Therefore, if the energization of the EHC 5 is controlled using the catalyst temperature T calculated based on the catalyst resistance value R in the area with a small slope, there is a possibility that a temperature rise of the EHC 5 is insufficient or excessive.

[Power-on Processing]

Next, power-on processing of the ECU 4 will be described.

Figure 5:
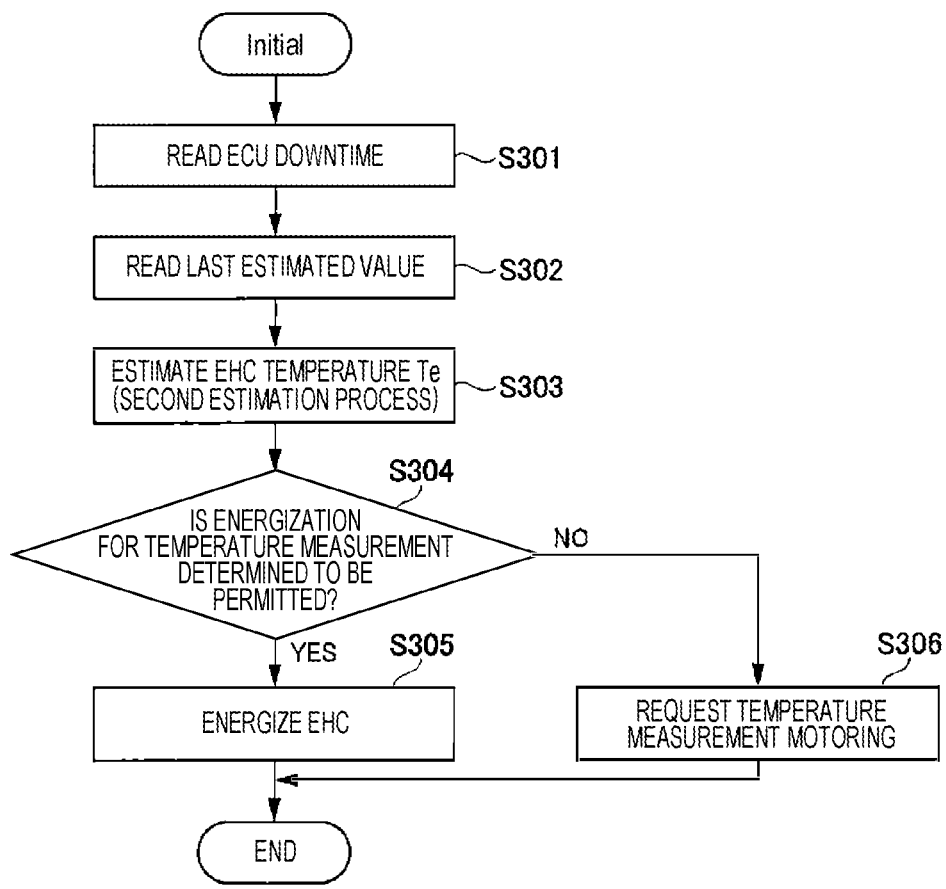
FIG. 5 is a flowchart illustrating an example of power-on processing of the electronic control device.

FIG. 5 is a flowchart illustrating an example of the power-on processing of the ECU 4.

First, when the ECU 4 is powered on, the ECU 4 reads downtime of the ECU 4 (S301). In this process, the ECU 4 measures an elapsed time (hereinafter referred to as "ECU downtime") until the power is turned on since a pause of the ECU 4 using the timer circuit 56 to acquire a time measurement result.

Next, the ECU 4 reads an estimated temperature (hereinafter referred to as "last estimated value") of the EHC 5 estimated last during the previous operation of the ECU 4 (S302). The last estimated value is, for example, stored in a nonvolatile storage. Examples of the nonvolatile storage include a hard disk drive (HDD), a solid state drive (SSD), a flexible disk, an optical disk, a magneto optical disk, a CD-ROM, a CD-R, a magnetic tape, a nonvolatile memory, or the like. Next, the ECU 4 estimates an EHC temperature Te based on the ECU downtime and the last estimated value (S303).

Figure 6:
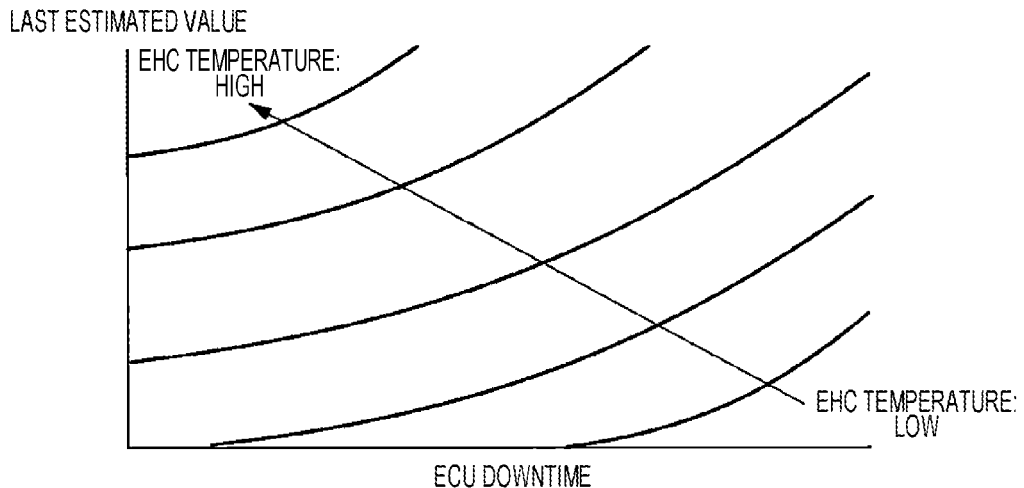
FIG. 6 is a view for describing estimation of an EHC temperature based on a last estimated value and an ECU downtime.

The estimation of the EHC temperature Te in S303 corresponds to a second estimation process according to the present invention. In addition, the EHC temperature Te estimated in S303 corresponds to an initial estimated temperature according to the present invention. The estimation of the EHC temperature Te in S303 is calculated from a relationship among the last estimated value, the ECU downtime, and the EHC temperature. FIG. 6 is a view for describing the estimation of the EHC temperature based on the last estimated value and the ECU downtime. As illustrated in FIG. 6, the EHC temperature Te to be estimated is higher as the last estimated value is higher. In addition, the EHC temperature Te to be estimated is higher as the ECU downtime is shorter.

Next, the ECU 4 determines whether energization for temperature measurement is possible based on the EHC temperature Te estimated in S303 (S304). In this process, the ECU 4 determines that the energization for temperature measurement is possible (YES) when the estimated EHC temperature Te falls within a predetermined temperature range. In addition, the ECU 4 determines that the energization for temperature measurement is not possible (NO) when the estimated EHC temperature is out of the predetermined temperature range.

The predetermined temperature range is determined according to the area with a large slope described with reference to FIG. 4. That is, in the process of S304, when an error in the catalyst temperature T calculated based on the catalyst resistance value R becomes small, it is determined that the EHC 5 is to be energized to calculate the catalyst temperature T based on the catalyst resistance value R. On the other hand, when the error in the catalyst temperature T calculated based on the catalyst resistance value R becomes large, it is determined not to calculate the catalyst temperature T (determined to perform another estimation) based on the catalyst resistance value R.

When it is determined in S304 that the energization for temperature measurement is possible (YES in S304), the ECU 4 starts the energization with respect to the EHC 5 (S305). When this process ends, the ECU 4 ends the power-on processing. On the other hand, when it is determined in S304 that the energization for temperature measurement is not possible (NO in S304), the ECU 4 requests the motor generator control circuit 8 to perform temperature measurement motoring (S306). After the process of S306, the ECU 4 ends the power-on processing.

Incidentally, when the last estimated value or the ECU downtime is indefinite due to an abnormality in the nonvolatile storage or the like, the EHC temperature Te is estimated to be out of the predetermined temperature range. Accordingly, NO is determined in S304, the energization for temperature measurement is prohibited, and temperature estimation by motoring is performed. As a result, overheating of the EHC 5 can be prevented, and thermal damage of the EHC 5 can be suppressed.

[Periodic Processing]

Next, periodic processing of the ECU 4 will be described.

Figure 7:
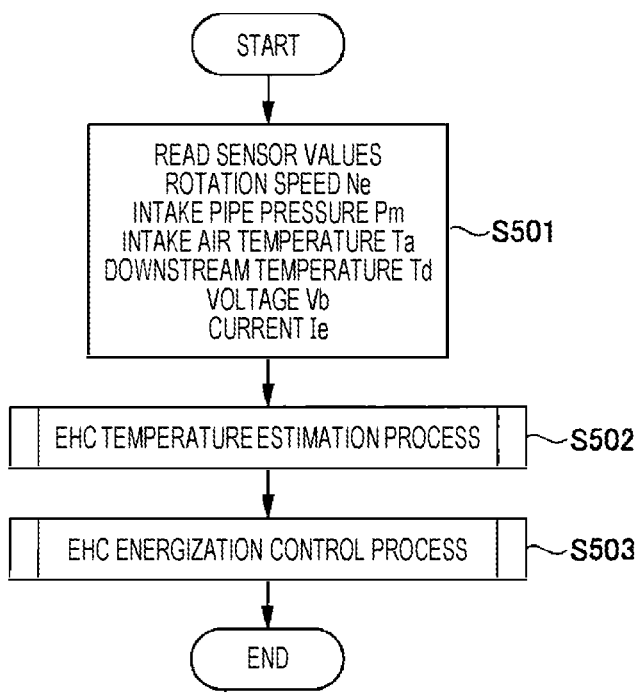
FIG. 7 is a flowchart illustrating an example of processing periodically performed by the electronic control device according to the embodiment of the present invention.

FIG. 7 is a flowchart illustrating an example of the processing periodically performed by the ECU 4.

The periodic processing of the ECU 4 is performed, for example, every 0.1 seconds. First, the ECU 4 acquires detection information of various sensors (S501). The detection information of the various sensors includes a rotation speed Ne detected by the rotation sensor 11, an intake pipe pressure Pm detected by the intake pressure sensor 15, and an intake air temperature Ta detected by the intake air temperature sensor 12. Further, the detection information of the various sensors includes an EHC downstream temperature Td detected by the catalyst downstream temperature sensor 10 and a voltage Vb and a current Ie detected by the voltage/current sensor 9.

Next, the ECU 4 performs an EHC temperature estimation process (S502). In the process of S502, the ECU 4 estimates a temperature of the EHC 5 based on a resistance value of the EHC 5 or estimates the temperature of the EHC 5 based on the EHC downstream temperature Td. The EHC temperature estimation process will be described later in detail with reference to FIG. 8.

Next, the ECU 4 performs an EHC energization control process (S503). In the process of S503, the ECU 4 controls the energization of the EHC 5 (turns on and off the energization) based on the estimated temperature of the EHC 5 (estimated EHC temperature) estimated in the process of S502 and a target temperature of the EHC 5. The EHC energization control process will be described later in detail with reference to FIG. 10.

[EHC Temperature Estimation Process]

Next, the EHC temperature estimation process will be described.

Figure 8:
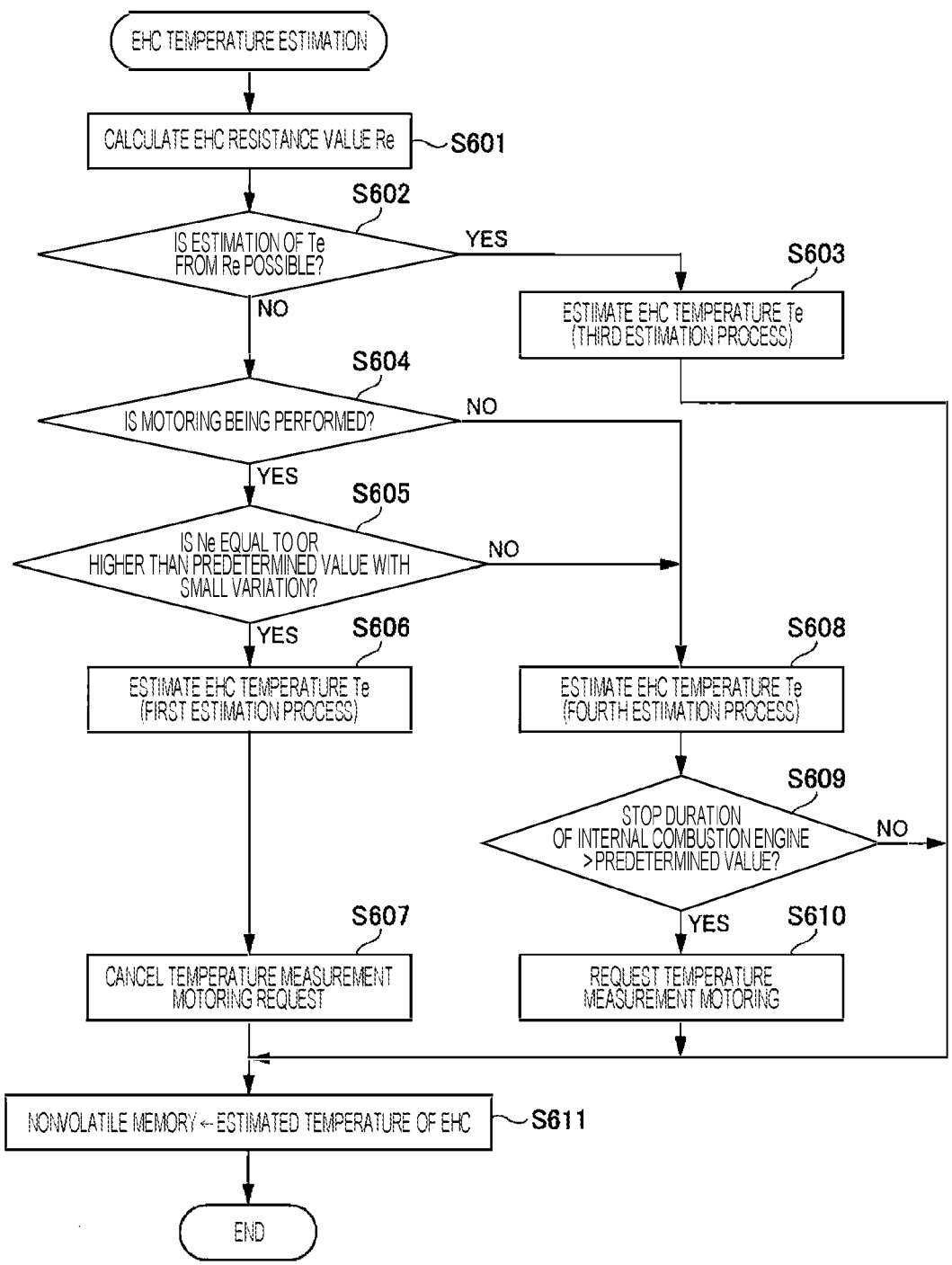
FIG. 8 is a flowchart illustrating an example of an EHC temperature estimation process by the electronic control device according to the embodiment of the present invention.
Figure 9:
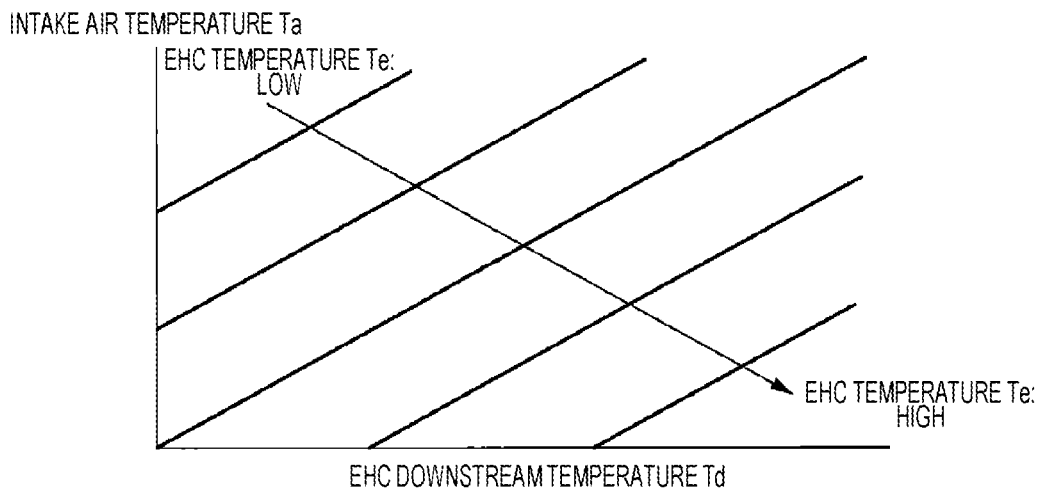
FIG. 9 is a view for describing a relationship among an intake air temperature, an EHC downstream temperature, and an EHC temperature.

FIG. 8 is a flowchart illustrating an example of the EHC temperature estimation process by the ECU 4.

First, the ECU 4 calculates a resistance value (EHC resistance value Re) of the EHC 5 from the voltage Vb and the current Ie (S601). Next, the ECU 4 determines whether a temperature of the EHC 5 can be estimated from the calculated EHC resistance value Re (S602).

In S602, the ECU 4 determines that the temperature of the EHC 5 can be estimated from the EHC resistance value Re (YES) when the EHC resistance value Re falls within a predetermined range correlated with the EHC temperature and a variation of the calculated EHC resistance value Re is small and stable. When at least one of the above-described two conditions is not satisfied, the ECU 4 determines that it is difficult to estimate the temperature of the EHC 5 from the EHC resistance value Re (NO).

When it is determined in S602 that the temperature of the EHC 5 can be estimated from the EHC resistance value Re (YES in S602), the ECU 4 estimates the EHC temperature Te from the EHC resistance value Re (S603). The estimation of the EHC temperature Te in S603 corresponds to a third estimation process according to the present invention. The EHC temperature Te is estimated by storing a table of the temperature-resistance characteristic in the ROM 54 in advance and searching the table. After the process of S603, the ECU 4 performs a process of S611 to be described later.

When it is determined in S602 that it is difficult to estimate the temperature of the EHC 5 from the EHC resistance value Re (NO in S602), the ECU 4 determines whether motoring is being performed (S604). When it is determined in S604 that the motoring is not being performed (NO in S604), the ECU 4 performs a process of S608 to be described later.

When it is determined in S604 that the motoring is being performed (YES in S604), the ECU 4 determines whether the rotation speed Ne is equal to or higher than a predetermined value and a variation of the rotation speed Ne is small (S605). When it is determined in S605 that the rotation speed Ne is equal to or higher than the predetermined value and the variation of the rotation speed Ne is not small (NO in S605), the ECU 4 performs a process of S608 to be described later.

When it is determined in S605 that the rotation speed Ne is equal to or higher than the predetermined value and the variation of the rotation speed Ne is small (YES in S605), the ECU 4 estimates the EHC temperature Te from the EHC downstream temperature Td (S606). The estimation of the EHC temperature Te in S606 corresponds to a first estimation process according to the present invention. The estimation of the EHC temperature Te is calculated from a relationship among the EHC downstream temperature Td, the intake air temperature Ta, and the EHC temperature Te stored in the ROM 54 in advance.

FIG. 7 is a view for describing the relationship among the EHC downstream temperature Td, the intake air temperature Ta, and the EHC temperature Te. As illustrated in FIG. 7, the EHC temperature Te to be estimated is higher as the intake air temperature Ta is lower. In addition, the EHC temperature Te to be estimated is higher as the EHC downstream temperature Td is higher. After the process of S606, the ECU 4 cancels the temperature measurement motoring request (S607).

On the other hand, when NO is determined in S604 and S605, the ECU 4 estimates the EHC temperature Te from a change in the temperature of the EHC 5 (S608). The estimation of the EHC temperature Te in S608 corresponds to a fourth estimation process according to the present invention. In the estimation of the EHC temperature Te, a temperature change of the EHC 5 is estimated first. Specifically, the temperature change of the EHC is exchange of heat with the exhaust gas, dissipation of heat to outside air, reaction heat of the catalyst, and heating by energization. Next, the EHC temperature Te is estimated by adding the temperature change of the EHC to the already estimated EHC temperature Te (previously estimated EHC temperature Te).

Incidentally, the temperature change of the EHC 5 during the stop of the internal combustion engine 1 is only the dissipation of heat to outside air and the heating by energization. In addition, the EHC temperature Te may be corrected by simultaneously estimating the EHC downstream temperature Td and comparing the EHC downstream temperature Td with an actually measured value. The estimation of the EHC downstream temperature Td is calculated based on a temperature of the exhaust gas before entering the EHC 5 and the previously estimated EHC temperature Te.

Next, the ECU 4 determines whether a stop duration of the internal combustion engine 1 has reached a predetermined value (S609). When it is determined in S609 that the stop duration of the internal combustion engine 1 has not reached the predetermined value (NO in S609), the ECU 4 performs a process of S611 to be described later.

When it is determined that the stop duration of the internal combustion engine 1 has reached the predetermined value in S609 (YES in S609), the ECU 4 requests the motor generator control circuit 8 to perform temperature measurement motoring (S610). During the stop of the internal combustion engine 1, it is difficult to reflect detection information of the catalyst downstream temperature sensor 10 in the estimated temperature of the EHC 5, and an error is integrated. Thus, the temperature measurement motoring is performed to prevent the integration of the error.

After the processes of S603, S607, and S610 or when NO is determined in S609, the ECU 4 stores the estimated EHC temperature Te in the nonvolatile storage (S611). The EHC temperature Te stored in the nonvolatile memory is used as the last estimated value in the power-on processing of the ECU 4. After the process of S611, the ECU 4 ends the EHC temperature estimation process.

[EHC Energization Control Process]

Next, the EHC energization control process will be described.

Figure 10:
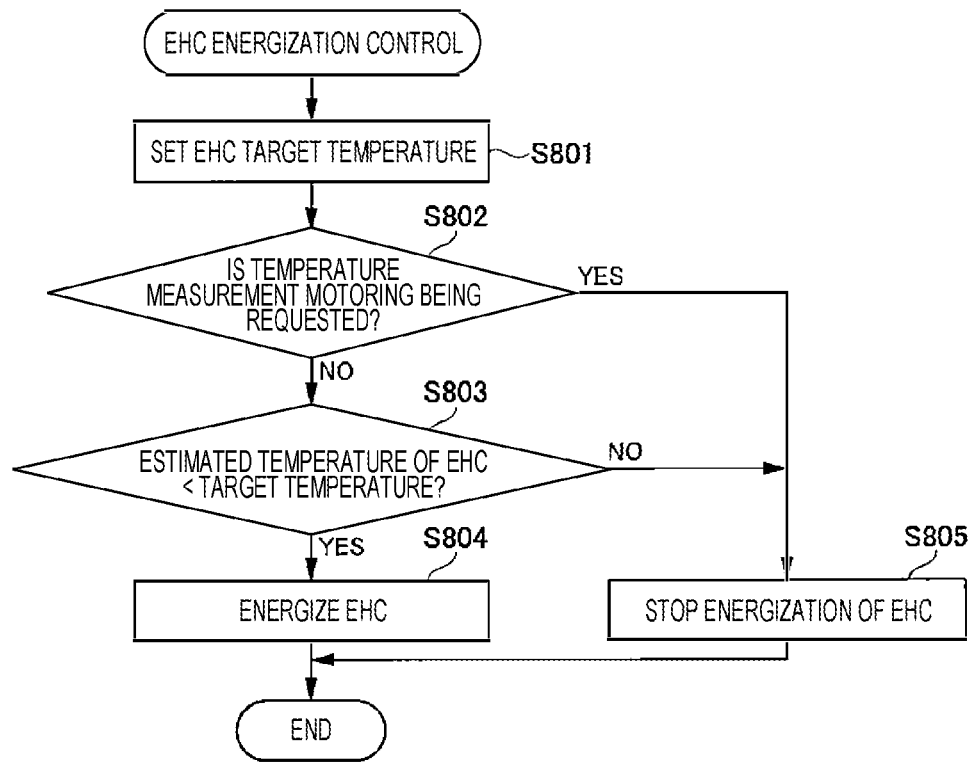
FIG. 10 is a flowchart illustrating an example of an EHC energization control process by the electronic control device according to the embodiment of the present invention.

FIG. 10 is a flowchart illustrating an example of the EHC energization control process by the ECU 4.

First, the ECU 4 sets a target temperature of the EHC 5 (S801). It suffices that the target temperature of the EHC 5 is set to a temperature at which a function of the catalyst is activated. Incidentally, when a temperature of the internal combustion engine 1 is low and a temperature of the exhaust gas is expected to be low, it is desirable to set the target temperature to be higher than the temperature at which the catalyst function is activated.

Next, the ECU 4 determines whether temperature measurement motoring is being requested (S802). When it is determined in S802 that the temperature measurement motoring is being requested (YES in S802), the ECU 4 performs a process of S805 to be described later.

On the other hand, when it is determined in S802 that the temperature measurement motoring is not being requested (NO in S802), the ECU 4 determines whether the EHC temperature Te estimated in the EHC temperature estimation process (see FIG. 8) is lower than the target temperature (S803). When it is determined in S803 that the estimated EHC temperature Te is equal to or higher than the target temperature (NO in S803), the ECU 4 performs a process of S805 to be described later.

On the other hand, when it is determined in S803 that the estimated EHC temperature Te is lower than the target temperature (YES in S803), the ECU 4 controls the EHC current breaker 7 to energize the EHC 5 (S804). After the process of S804, the ECU 4 ends the EHC energization control process.

When YES is determined in S802 or NO is determined in S803, the ECU 4 controls the EHC current breaker 7 to stop the energization of the EHC 5 (S805). After the process of S805, the ECU 4 ends the EHC energization control process. In this manner, where is a case where the estimated EHC temperature Te includes an error while the temperature measurement motoring is being requested (YES in S802), the energization of the EHC 5 is stopped to prevent thermal damage.

Incidentally, the target temperature of the EHC 5 may be configured to have hysteresis such that the energization and the stop of the energization are not repeated in a short period of time. In addition, a voltage applied to the EHC may be changed according to a difference between the estimated EHC temperature and the target temperature. In addition, as the EHC energization control, duty control may be adopted to change a duty value.

[Temperature Control of EHC]

Next, an operation related to temperature control of the EHC 5 will be described.

Figure 11:
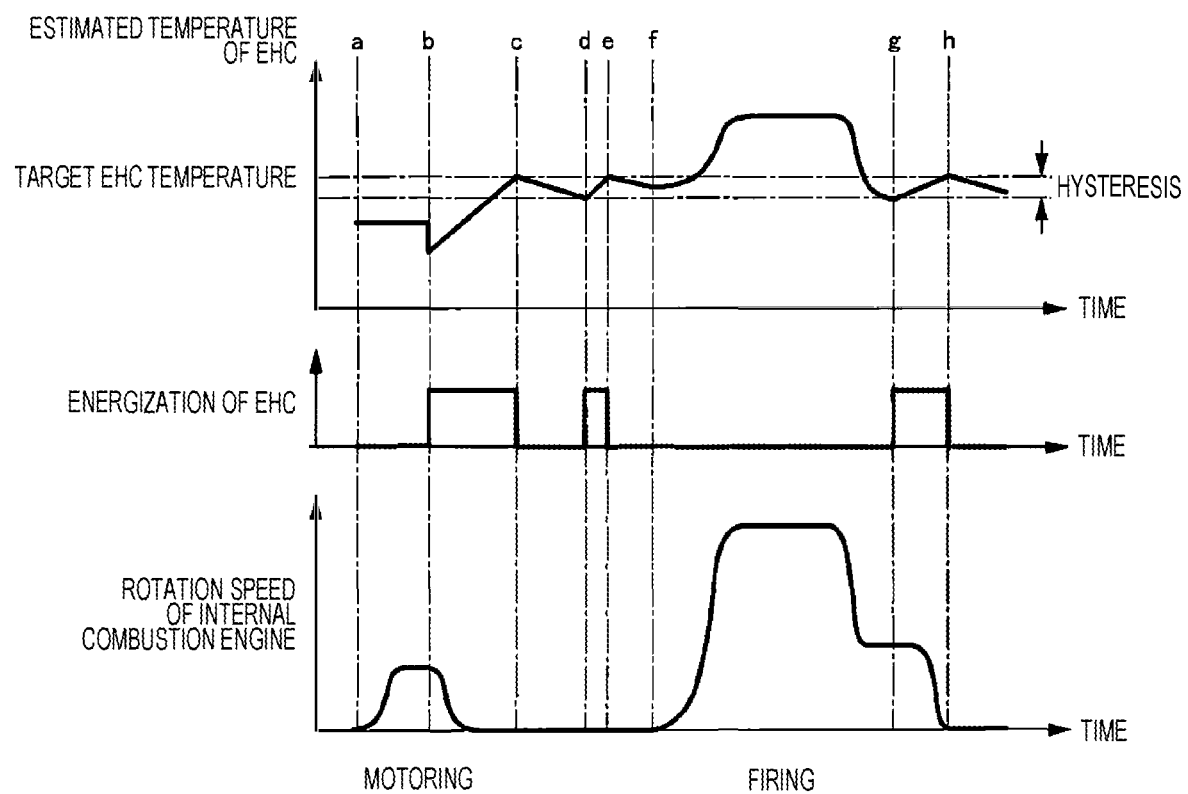
FIG. 11 is a view (Part 1) for describing the operation related to EHC temperature control by the electronic control device according to the embodiment of the present invention.

FIG. 11 is a view (Part 1) for describing the operation related to the temperature control of the EHC 5.

When the ECU 4 is powered on, a temperature of the EHC 5 is estimated from ECU downtime and a last estimated value. Then, it is determined whether estimation of the temperature of the EHC 5 by energization is possible according to the estimated temperature of the EHC 5. When it is determined that the estimation of the temperature of the EHC 5 by energization is not possible, temperature measurement motoring is started (time a) as illustrated in FIG. 11.

The temperature of the EHC 5 is estimated by the temperature measurement motoring based on detection information of the catalyst downstream temperature sensor 10 at a time point when a rotation speed of the internal combustion engine 1 is stable (time b). At the time b, a step is generated in the estimated temperature of the EHC 5. This is because the estimated temperature of the EHC 5 at the time b is more accurate than the estimated temperature of the EHC 5 at the time a.

When the estimated temperature of the EHC 5 has not reached a target EHC temperature at the time b, energization of the EHC 5 is started. Incidentally, the target EHC temperature is set in a predetermined range from a target EHC temperature upper limit to a target EHC temperature lower limit. After the time b, the EHC temperature is estimated by integrating the temperature change of the EHC 5. When the estimated temperature of the EHC 5 reaches the target EHC temperature upper limit, the energization of the EHC 5 is ended (time c). Accordingly, the estimated temperature of the EHC 5 gradually decreases.

Then, when the estimated temperature of the EHC 5 reaches the target EHC temperature lower limit, energization of the EHC 5 is started (time d). Thereafter, when the estimated temperature of the EHC 5 reaches the target EHC temperature upper limit, the energization with respect to the EHC 5 is ended (time e). In this manner, feedback control is executed based on the estimated temperature of the EHC 5 and the target EHC temperature (upper limit and lower limit). Incidentally, even after the internal combustion engine 1 is started (time f) due to a request from a driver, an insufficient remaining capacity of the battery, or the like, the estimation of the temperature of the EHC 5 and the determination of the energization with respect to the EHC 5 are sequentially performed.

Figure 12:
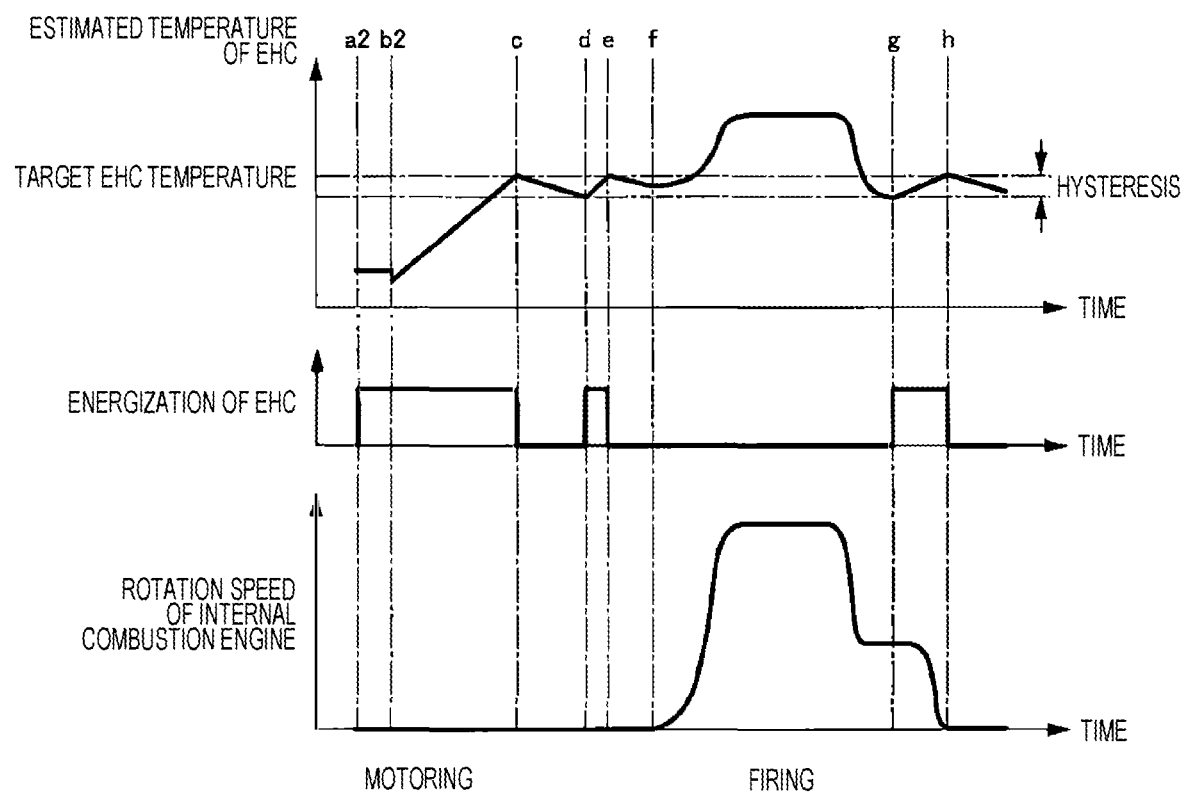
FIG. 12 is a view (Part 2) for describing the operation related to the EHC temperature control by the electronic control device according to the embodiment of the present invention.

FIG. 12 is a view (Part 2) for describing the operation related to the temperature control of the EHC 5.

When the ECU 4 is powered on, a temperature of the EHC 5 is estimated from ECU downtime and a last estimated value. Then, it is determined whether estimation of the temperature of the EHC 5 by energization is possible according to the estimated temperature of the EHC 5. When it is determined that the temperature estimation of the EHC 5 by energization is possible, energization of the EHC 5 is started (time a2) as illustrated in FIG. 12.

Then, the catalyst resistance R is calculated from a voltage and a current obtained from the voltage/current sensor 9, and the temperature of the EHC 5 is estimated from the catalyst resistance R (time b2). When the estimated temperature of the EHC 5 has not reached the target EHC temperature at the time b2, the energization of the EHC 5 is maintained. When the estimated temperature of the EHC 5 reaches the target EHC temperature upper limit, the energization of the EHC 5 is ended (time c). The operation after the time c is the same as the operation described with reference to FIG. 11.

Figure 13:
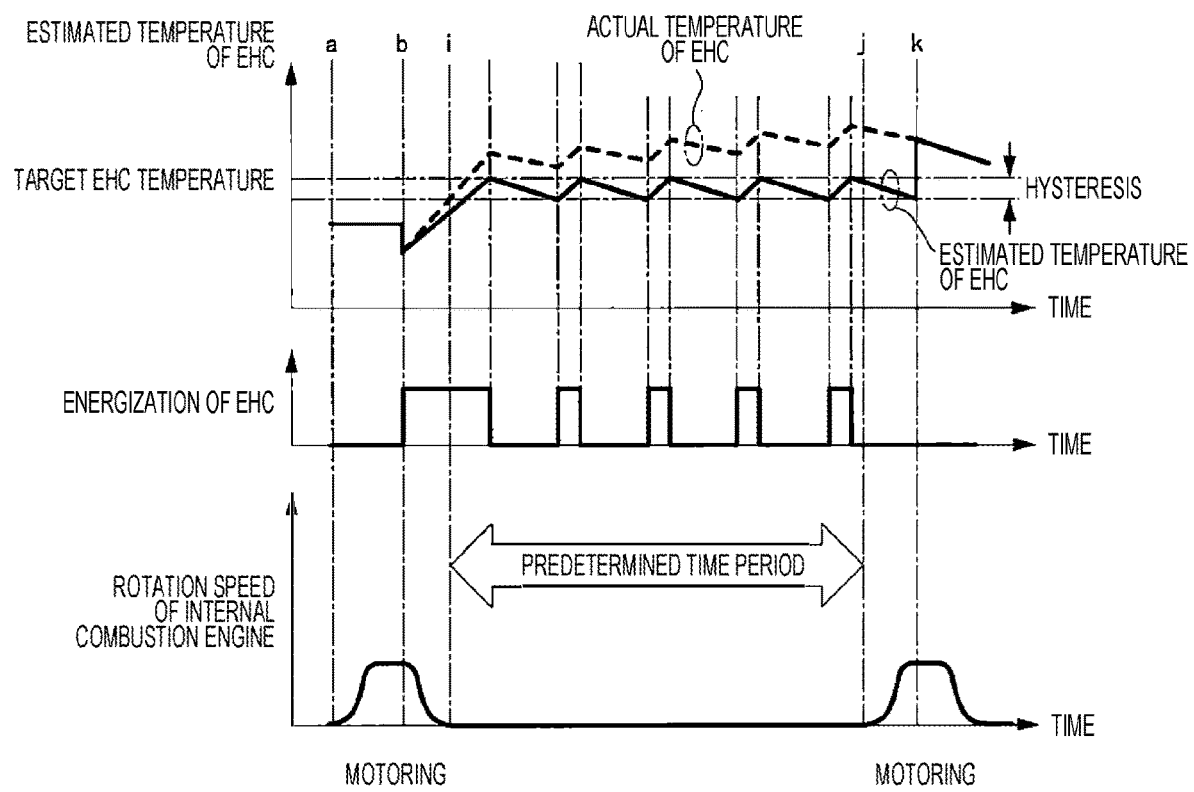
FIG. 13 is a view (Part 3) for describing the operation related to the EHC temperature control by the electronic control device according to the embodiment of the present invention.

FIG. 13 is a view (Part 3) for describing the operation related to the temperature control of the EHC 5.

When the ECU 4 is powered on, a temperature of the EHC 5 is estimated from ECU downtime and a last estimated value. Then, it is determined whether estimation of the temperature of the EHC 5 by energization is possible according to the estimated temperature of the EHC 5. When it is determined that the estimation of the temperature of the EHC 5 by energization is not possible, temperature measurement motoring is started (time a) as illustrated in FIG. 13.

The temperature of the EHC 5 is estimated by the temperature measurement motoring based on detection information of the catalyst downstream temperature sensor 10 at a time point when a rotation speed of the internal combustion engine 1 is stable (time b). After the time b, feedback control is executed based on the estimated temperature of the EHC 5 and the target EHC temperature (upper limit and lower limit). Accordingly, the energization and the stop of the energization of the EHC 5 are repeated, and the estimated temperature of the EHC 5 falls within the predetermined range.

However, air does not flow into the exhaust flow path 14 when the internal combustion engine 1 is stopped. Thus, it is difficult for the catalyst downstream temperature sensor 10 to detect a temperature of the air that has passed through the EHC 5. Therefore, it is difficult to reflect the detection information of the catalyst downstream temperature sensor 10 in the temperature estimation of the EHC 5. Thus, when the internal combustion engine 1 is stopped, an estimated temperature of the EHC 5 is calculated by integrating heating by the energization of the EHC 5 and dissipation of heat to outside air.

When the estimated temperature of the EHC 5 is calculated by integrating the heating by the energization of the EHC 5 and the dissipation of heat to outside air, an error gradually accumulates between the estimated temperature (a solid line) of the EHC 5 and an actual temperature (a broken line) of the EHC 5 as indicated by the solid line and the broken line in the drawing. Therefore, temperature measurement motoring is started at a time point (time j) when a predetermined time period has elapsed since the stop of the internal combustion engine 1 (time i). Then, the temperature of the EHC 5 is estimated based on the detection information of the catalyst downstream temperature sensor 10 (time k). Accordingly, the estimated temperature of the EHC 5 is made to coincide with or approximate to the actual temperature.

2. Summary

As described above, the electronic control device (ECU 4) according to the above-described embodiment controls an engine system which includes: an internal combustion engine (the internal combustion engine 1); a motor (the motor generator 2) capable of motoring the internal combustion engine; a catalyst (the EHC 5) that is installed in an exhaust passage (the exhaust flow path 14) of the internal combustion engine, has a function of being heated by energization, and purifies exhaust gas; and a downstream temperature sensor (the catalyst downstream temperature sensor 10) installed on the downstream side of the catalyst. The electronic control device includes: a control unit (the control unit 42) that causes the motor to motor the internal combustion engine; and an estimation unit (the estimation unit 41) that performs a first estimation process of estimating a temperature of the catalyst based on detection information of the downstream temperature sensor when the internal combustion engine is motored. Accordingly, air that has passed through the catalyst can be supplied to the downstream temperature sensor, and thus, the temperature of the catalyst can be estimated with high accuracy from the detection information of the downstream temperature sensor. In addition, the rotation of the internal combustion engine is motoring performed without the supply of fuel, and thus, there is no possibility of releasing unburned gas to the atmosphere even when the temperature of the catalyst is low and the purification capability is low.

In addition, the estimation unit (estimation unit 41) in the electronic control device (ECU 4) of the above-described embodiment performs a second estimation process of estimating a temperature of the catalyst from an estimated temperature of the catalyst (EHC 5) at a previous power interruption and an elapsed time from the previous power interruption before performing the first estimation process and before the internal combustion engine (internal combustion engine 1) is started. Accordingly, it is possible to estimate the temperature of the catalyst (at the time of turning on the power) before performing the first estimation process and before the internal combustion engine is started. In addition, the temperature of the catalyst can be estimated without energizing the catalyst.

In addition, the estimation unit (estimation unit 41) in the electronic control device (ECU 4) of the above-described embodiment estimates a temperature of the catalyst (EHC 5) by the first estimation process when an initial estimated temperature estimated by the second estimation process is out of a predetermined temperature range. Accordingly, it is possible to estimate the temperature of the catalyst with high accuracy from the detection information of the downstream temperature sensor without estimating the temperature of the catalyst from a resistance value of the catalyst when an error in the temperature of the catalyst to be calculated increases due to the occurrence of a measurement error or a fluctuation in the resistance value of the catalyst.

In addition, the estimation unit (estimation unit 41) in the electronic control device (ECU 4) of the above-described embodiment estimates the initial estimated temperature to be out of the predetermined temperature range when the estimated temperature of the catalyst (EHC 5) at the previous power interruption or the elapsed time from the previous power interruption is indefinite. Accordingly, the temperature of the catalyst is not estimated from the resistance value of the catalyst, and thus, the energization with respect to the catalyst can be stopped. As a result, overheating of the catalyst can be prevented, and thermal damage of the catalyst can be suppressed.

In addition, the estimation unit (estimation unit 41) in the electronic control device (ECU 4) according to the above-described embodiment performs a third estimation process of estimating a temperature of the catalyst based on the resistance value of the catalyst (EHC 5) when the initial estimated temperature estimated by the second estimation process falls within the predetermined temperature range. Accordingly, the temperature of the catalyst can be estimated from the resistance value of the catalyst when the error in the temperature of the catalyst to be calculated decreases even if the measurement error or fluctuation in the resistance value of the catalyst occurs.

In addition, the estimation unit (estimation unit 41) in the electronic control device (ECU 4) of the above-described embodiment performs a fourth estimation process of estimating a temperature of the catalyst by integrating an estimated value of a temperature change of the catalyst (EHC 5) after performing the first estimation process or the third estimation process. Accordingly, the temperature of the catalyst can be estimated even after the first estimation process or the third estimation process is performed. As a result, feedback control can be performed based on the temperature of the catalyst estimated by the fourth estimation process, and the temperature of the catalyst can be kept within the predetermined range.

In addition, the control unit (control unit 42) in the electronic control device (ECU 4) of the above-described embodiment motors the internal combustion engine (internal combustion engine 1) when the internal combustion engine (internal combustion engine 1) is continuously stopped for a predetermined period of time since the fourth estimation process is performed, and the estimation unit (estimation unit 41) performs the first estimation process when the internal combustion engine is motored. Accordingly, the estimated temperature of the catalyst (EHC 5) can be made to coincide with or approximate to an actual temperature of the catalyst.

The embodiment of the electronic control device of the present invention has been described above including operational effects thereof. However, the electronic control device of the present invention is not limited to the above-described embodiment, and various modifications can be made within a scope not departing from a gist of the invention described in the claims. In addition, the above-described embodiment has been described in detail in order to describe the present invention in an easily understandable manner, and is not necessarily limited to one including the entire configuration that has been described above.

For example, the motor generator 2 is provided between the internal combustion engine 1 and the transmission 3 in the above-described embodiment. However, it suffices that the engine system to be controlled by the electronic control device according to the present invention includes a motor capable of motoring the internal combustion engine.

REFERENCE SIGNS LIST 1 internal combustion engine
2 motor generator
3 transmission
4 ECU (electronic control device)
5 EHC
6 battery
7 EHC current breaker
8 motor generator control circuit
9 voltage/current sensor
10 catalyst downstream temperature sensor
11 rotation sensor
12 intake air temperature sensor
13 intake flow path
14 exhaust flow path
15 intake pressure sensor
41 estimation unit
42 control unit
50 analog signal
51 digital signal
52 A/D converter
53 CPU
54 ROM
55 RAM
56 timer circuit
57 driver circuit
58 control signal

The invention claimed is:

1. An electronic control device that controls an engine system that includes an internal combustion engine, a motor capable of motoring the internal combustion engine, a catalyst that is installed in an exhaust passage of the internal combustion engine, has a function of being heated by energization, and purifies exhaust gas, and a downstream temperature sensor installed on a downstream side of the catalyst, the electronic control device comprising:

a controller to cause the motor to motor the internal combustion engine; and an estimator that runs a first estimation process of estimating a temperature of the catalyst based on detection information of the downstream temperature sensor when the internal combustion engine is motored;

wherein the estimator runs a second estimation process of estimating a temperature of the catalyst from an estimated temperature of the catalyst at a previous power interruption and an elapsed time from the previous power interruption before performing the first estimation process and before the internal combustion engine is started.

2. The electronic control device according to claim 1, wherein the estimator runs a temperature of the catalyst by the first estimation process when an initial estimated temperature estimated by the second estimation process is out of a predetermined temperature range.

3. The electronic control device according to claim 2, wherein the estimator runs the initial estimated temperature to be out of the predetermined temperature range when the estimated temperature of the catalyst at the previous power interruption or the elapsed time from the previous power interruption is indefinite.

4. The electronic control device according to claim 1, wherein the estimator runs a third estimation process of estimating a temperature of the catalyst based on a resistance value of the catalyst when the initial estimated temperature estimated by the second estimation process falls within a predetermined temperature range.

5. The electronic control device according to claim 4, wherein the estimator runs a fourth estimation process of estimating a temperature of the catalyst by integrating an estimated value of a temperature change of the catalyst after performing the first estimation process or the third estimation process.

6. The electronic control device according to claim 5, wherein
the controller causes the internal combustion engine to be motored when the internal combustion engine is continuously stopped for a predetermined period of time since the fourth estimation process is performed, and
the estimator runs the first estimation process when the internal combustion engine is motored.

* * * * *